United States Patent [19]

Bergling

[11] Patent Number: 4,973,173
[45] Date of Patent: Nov. 27, 1990

[54] MOUNTING METHOD AND ROLLING BEARING ARRANGEMENT

[75] Inventor: Gunnar Bergling, Partille, Sweden

[73] Assignee: AB SKF, Gothenburg, Sweden

[21] Appl. No.: 453,945

[22] Filed: Dec. 20, 1989

[30] Foreign Application Priority Data

Dec. 21, 1988 [SE] Sweden .................................. 8804612

[51] Int. Cl.⁵ .............................................. F16C 19/30
[52] U.S. Cl. ..................... 384/619; 384/538; 384/556; 384/620
[58] Field of Search ............... 384/619, 620, 585, 569, 384/271, 272, 556, 538, 571

[56] References Cited

U.S. PATENT DOCUMENTS

| 2,043,272 | 6/1936 | Wallgren | 384/272 |
| 3,918,779 | 11/1975 | Halliger et al. | 384/538 |
| 4,883,371 | 11/1989 | Matsumoto | 384/571 |
| 4,893,948 | 1/1990 | Hoch | 384/538 |

Primary Examiner—Lenard A. Footland
Attorney, Agent, or Firm—Eugene E. Renz, Jr.

[57] ABSTRACT

A rolling bearing (12) is arranged to support a shaft (10) rotatably in a housing (13). In order to make simple mounting and dismounting of the bearing (12) possible this is first fitted with a loose fit to the shaft (10), whereupon the shaft (10) is caused to expand thus that an interference fit is obtained at the same time as desired preload can be obtained in the bearing (12). The invention is intended to be applied particularly when mounting a drill head to a tunnel drilling machine.

3 Claims, 1 Drawing Sheet

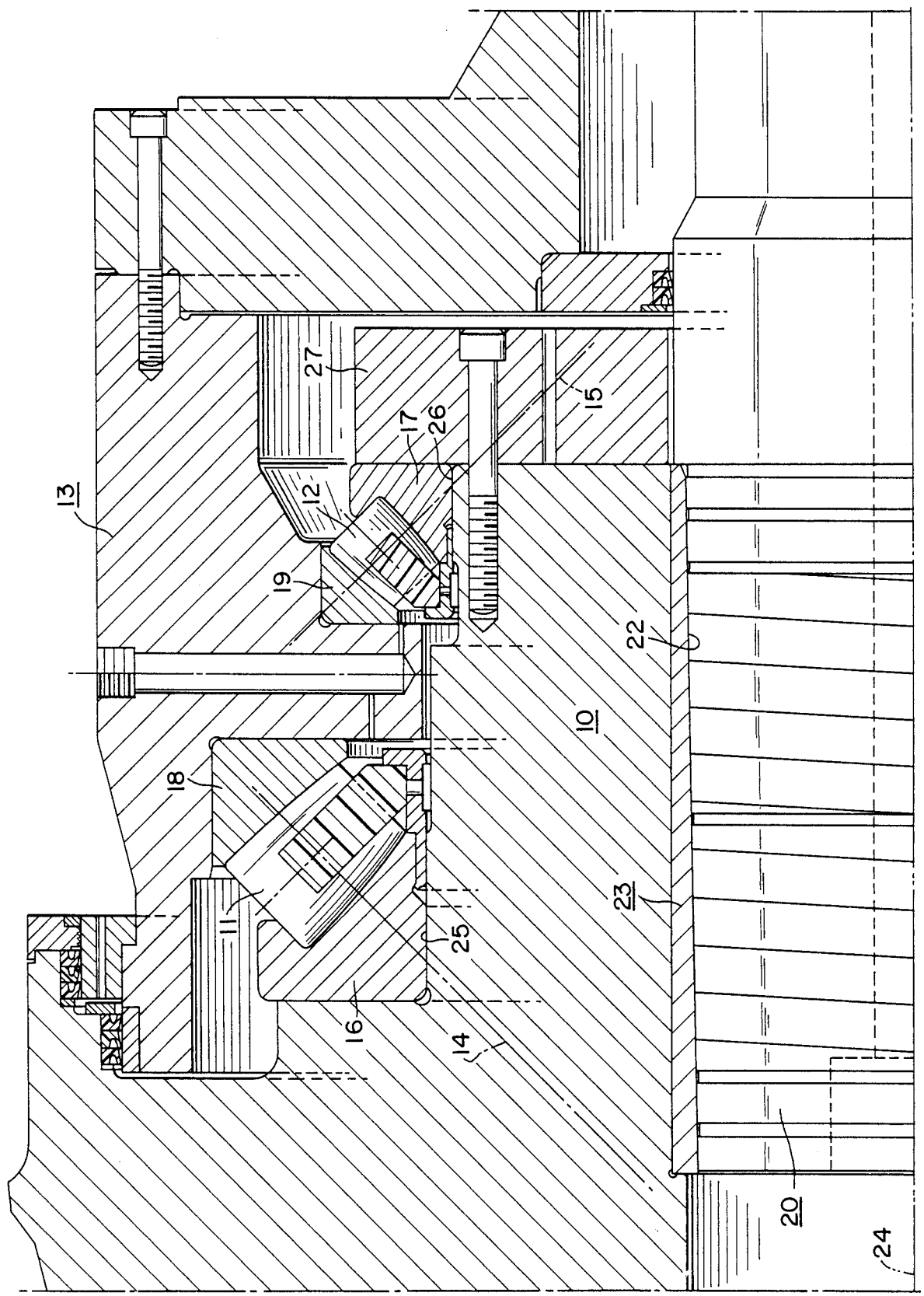

MOUNTING METHOD AND ROLLING BEARING ARRANGEMENT

FIELD OF THE INVENTION

The present invention refers to a mounting method and a rolling bearing arrangement, such as spherical roller thrust bearing and taper roller bearing, which are arranged to support a shaft rotatably in a housing. The invention refers particularly to a method and a bearing assemblies arrangement for mounting a drill head on a tunnel drilling machine.

BACKGROUND OF THE INVENTION

Bearings for such types of assemblies, such as in tunnel drilling machines, often have large dimensions. To facilitate mounting and dismounting the bearings, they are often mounted with a loose fit on the shaft, although the rotating load occurring during operation in relation to the inner race rings of the bearing, according to normal regulations, requires an interference fit between the inner race rings and the shaft. According to recommendations from bearing manufacturers, a tolerance choice of about r7 for shaft diameters larger than 500 mm is recommended. One of the drawbacks of the loose fit used contrary to the recommendations is that wear will occur on shaft and axial supporting surfaces.

In tunnel drilling machines, the axial loads occurring during operation are very large, whereby the bearings are often assembled in preloaded condition to better compensate for the increasing play occurring in the bearing due to the elastic deflection of the bearing during drilling. If the axial supporting surfaces of the bearings are subjected to wear, the preload on the bearings is decreased.

SUMMARY OF THE INVENTION

A purpose of the present invention is to make possible an easy mounting and dismounting of large bearings and at the same time assume the required grip between the inner race rings of the bearings and the shaft supported by the bearings during operation, in order to prevent circumferential movement of the inner race rings relative to the shaft.

Another purpose of the invention is to provide a desired preload on the bearings, at the same time as the required grip between bearings and shaft is achieved.

BRIEF DESCRIPTION OF THE DRAWINGS

The invention hereinafter is described with reference to the accompanying drawing, which shows an enlarged sectional view through a drill head of a tunnel drilling machine.

DETAILED DESCRIPTION OF THE PREFERRED EMBODIMENT

Referring to the drawing, there is shown two spherical roller thrust bearings 11, 12 arranged to support a shaft boss 10 rotatably in a bearing housing 13. The bearings 11, 12 are mounted in tandem in so called O-configuration, i.e. that the contact lines 14, 15 of the bearings projecting towards the centre line 24 of the shaft boss 10 diverge. The bearings alternatively may change place, i.e. be mounted in so-called X-configuration, whereby the contact lines 14, 15 converge. The shaft boss 10 is adapted to support a drill head (not shown) of a tunnel drilling machine in a manner known per se.

The inner race rings 16, 17 of the bearings 11, 12 and the corresponding bearing surfaces 25, 26 of the shaft boss 10 are mutually dimensioned in such a manner that the bearings 11, 12 may be mounted with loose fit on the shaft boss 10. Loose fit in this context primarily implies a fit allowing easy axial displacement of the inner race rings 16, 17 relative to the shaft boss 10. In all cases, the fit must be such that the possibly occurring grip is less than the interference fit required for avoiding relative movement between the inner race rings and the shaft boss.

When the bearings 11, 12 have been positioned on the shaft boss 10 and in the bearing housing 13, a supporting washer 27 is bolted to the shaft boss, whereby the bearing assembly forms a unit.

A drive shaft 20 for rotation of the drill head is arranged to be inserted into the shaft boss 10 and is affixed thereto by means of a taper sleeve 23. The bearing unit and the taper sleeve 23 are preferably driven up on the tapering surface 22 of the drive shaft 20 in an appropriate manner known per se, and is preferably used for facilitating mounting as well as dismounting.

Dueing the time the bearing unit is driven up the shaft, boss 10 expands to produce a grip between it and the inner race rings 16, 17. The driving up length on the tapering shaft seat, and the loose fit between the inner race rings and the shaft boss 10 prior to the driving up operation, thereby is adapted so that after driving up has concluded, the grip between the inner race rings 16, 17 and the shaft boss 10 will give the required interference fit. For example, a required interference fit would be the fit corresponding to what is achieved with a r7-tolerance on a cylindrical shaft in order to prevent relative movement between the inner race rings 16, 17 and the shaft boss 10 during drilling operations. The tapering interference fit thereby shall be able to transfer torque occurring during drilling with desired safety.

According to the invention, it is also possible that the expansion means, i.e. in the embodiment shown in the taper sleeve 23, shall be used for providing the desired preload of the bearings 11, 12. By machining the supporting washer 27 or by aid of shims, it is ascertained that an appropriate initial play (e.g. a zero play), is obtained when the supporting washer 27 is affixed by bolting. This initial play is adapted to the driving up length on the tapering shaft seat thus that the bearings 11, 12 obtain the desired preload after driving up has concluded.

The invention thus makes possible a simple mounting (and possible dismounting) with loose fits, at the same time as these change to interference fits when the mounting is concluded. The bearings then also have obtained desired preload.

In the embodiment shown, the sleeve 23 is internally tapered and externally cylindrical. Alternatively, the sleeve may be tapered externally, and internally cylindrical. It is also possible to eliminate the sleeve 23 and to allow the shaft boss 10 on the shaft 20. The taper, in all cases, is chosen in an appropriate manner.

The invention may be generally applied to all types of assemblies and for all types of bearings appropriate in this context. It is particularly possible for tunnel drilling machines to use roller path bearings for the assembly advantageously according to the invention.

What is claimed is:

1. The combination comprises two bearings (11, 12) mounted in pairs, arranged to support a shaft (10) rotatably in a housing (13), characterized in that inner race rings (16, 17) of the bearings and corresponding bearing surfaces (25, 26) on the shaft (10) are mutually dimensioned in such a way that the bearings (11, 12) can be mounted with loose fit on the shaft (10), in that the shaft (10) is provided with expansion means (20; 20, 23) adapted, after mounting of the bearings (11, 12) on the shaft (10), to expand the shaft (10) so that in operation there is obtained a press fit required for avoiding relative movement between the inner race rings (16, 17) of the bearings and the shaft (10), and when required, there is obtained a preload of the bearings (11, 12).

2. A device according to claim 1, wherein the bearings (11, 12) are arranged with contact lines converging or diverging towards the shaft (10), characterized in that said shaft (10) is the hub-shaped shaft, whereby at least one of the opposed surfaces (21, 22) of the drive shaft (20) and the hub-shaped shaft (10) is tapered, and that a conical sleeve (23) is adapted to be inserted between said surfaces (21, 22).

3. A device according to claim 2 or 3, wherein the shaft (10) is adapted to carry a bore head of a tunneling machine.

* * * * *